United States Patent Office 3,189,024
Patented June 15, 1965

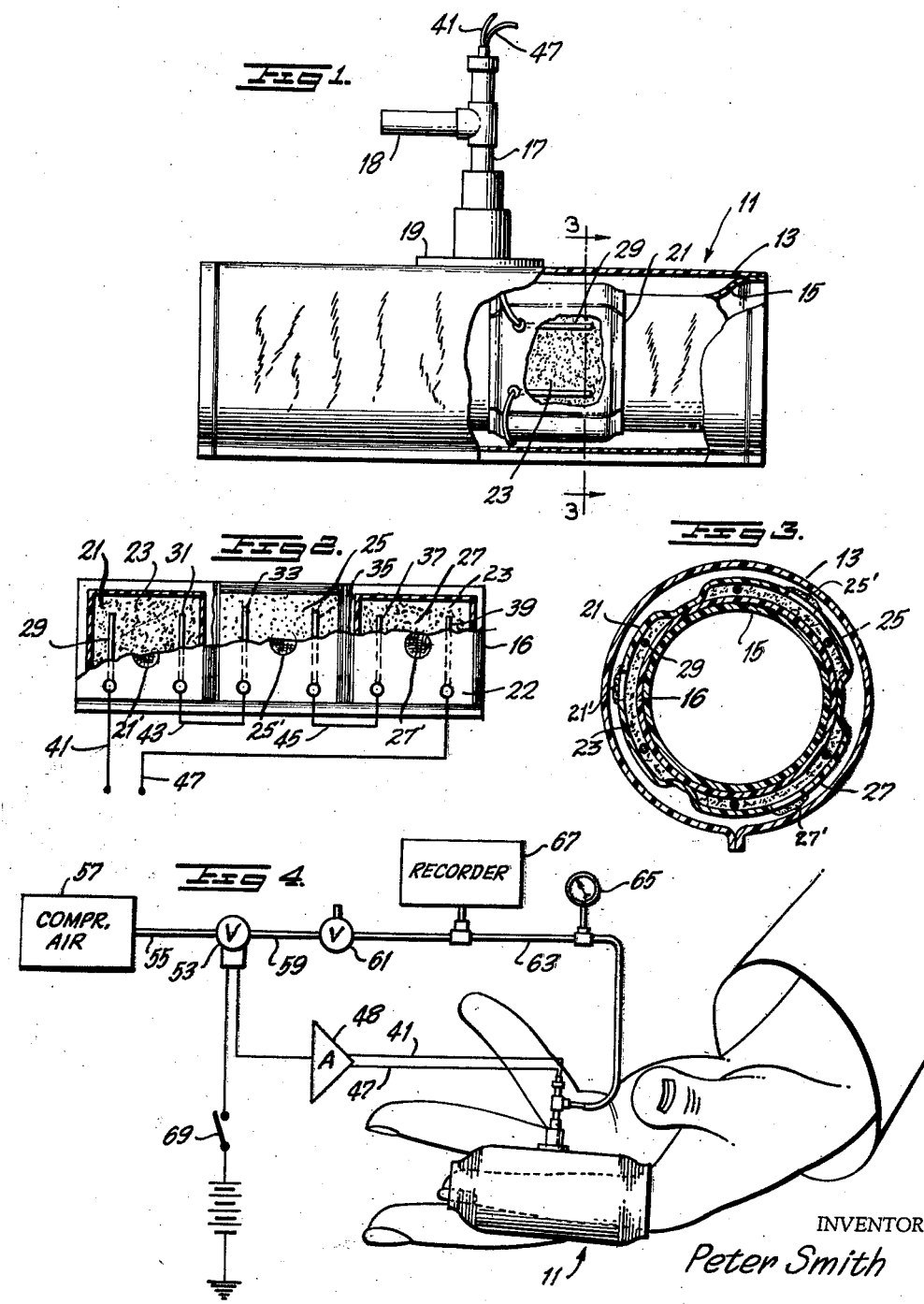

3,189,024
BLOOD PRESSURE TRANSDUCER
Peter Smith, Glendola, N.J., assignor to Dynamics Corporation of America, New York, N.Y., a corporation of New York
Filed May 31, 1962, Ser. No. 199,179
10 Claims. (Cl. 128—2.05)

This invention relates to a transducer and more specifically to a blood pressure transducer contained as an integral part of an inflatable digital cuff.

It is now well known that accurate blood pressure and pulse indications may be obtained through the use of an inflatable cuff and associated transducer placed adjacent to the digit of a patient. The known procedure for obtaining such pressures and indications has been to place an electromechanical transducer over the artery within a digit and secure the transducer to the digit in some manner, such as by tape, with the electrical leads extending outwardly from the end of the digit. An inflatable cuff is then slipped over the digit and encloses the electromechanical transducer. The transducer detects pressure pulsations within the digit and, as the cuff is inflated, it measures the pressure point wherein such pulsations cease. Associated equipment may be used to determine this pressure point thus producing an indication of the blood pressure of the patient. Such a transducer, cuff and system are shown in copending U.S. application Serial No. 58,115, filed September 23, 1960, in the name of John H. Green, now Patent 3,143,111.

The above system contains several inherent disadvantages. One of the major drawbacks of the system is the fact that any movement of the digit by the patient causes extraneous signals, known generally as artifact, which appear in the output of the transducer, thus giving erroneous signals which are difficult to read and which limit the accuracy of the device. Another disadvantage is that the electromechanical transducer must be placed accurately over the artery of the digit in order to obtain the proper output from the transducer itself. Additionally, the accurate placing of the transducer and the subsequent fitting of the cuff require two separate operations and, if the transducer is inaccurately placed or shifts for any reason, the cuff must be removed before the transducer can be accurately repositioned.

Accordingly, it is an object of this invention to provide a device for detecting arterial pulsations in a digit.

A further object is to provide a device for detecting arterial pulsations for determining blood pressure within a digit.

A still further object is to provide a blood pressure transducer having the basic constricting and transducing elements in one basic device.

Another object of this invention is to provide a transducer for detecting arterial pulsations which is substantially free from artifact.

Yet another object of this invention is to provide a transducer within a constricting cuff which does not require precise positioning of the cuff at any one point on the digit.

These and other objects will become apparent to those skilled in the art from the following description taken in conjunction with the drawings wherein:

FIG. 1 is an elevational view, partially broken away, of the device of the present invention;

FIG. 2 is a partially broken away view of the basic transducer contained within the cuff of FIG. 1;

FIG. 3 is a sectional view taken along lines 3—3 of FIG. 1; and

FIG. 4 is a diagrammatic representation of the device in use on the digit of a patient together with the basic equipment for determining and recording the blood pressure of the patient.

Turning now more specifically to the drawings, FIG. 1 illustrates the cuff 11 having an outer shell 13 which may be of any material, either pliable or rigid, and an inner lining 15 which may be of a flexible or pliable material such as any of the well-known plastics. A conduit 17 extends from the outer shell 13 in order to provide a means for inflating the area between the outer shell 13 and the inner lining 15, thus causing the lining to expand inwardly for constricting a digit placed within the cuff. A connecting conduit 18 branches off from conduit 17 in order to supply a connection to a compressed air supply through means such as flexible hosing or the like. A seal 19 prevents air forced into the cuff from escaping about the conduit 17.

Secured about the circumference of the inner lining 15 and substantially centrally thereof is a further element having a plurality of compartments therein as more specifically illustrated in FIG. 2. In this illustration such element is shown in its extended position before being circumferentially secured about the inner lining 15 as illustrated in FIG. 1.

The basic object of the present invention is to provide, in effect, a circular transducer about the entire circumference of a digit whereby pulsations may be detected regardless of the particular position of the cuff on the digit. With this in mind, the compartments 21, 25 and 27, created by heat sealing a strip of material such as polyethylene to a base sheet, each contain particulate material which may be of any of the electrically conductive materials, such as carbon. Secured within each of the compartments in a spaced relationship are the electrodes 29, 31, 33, 35, 37 and 39. As can be seen, these electrodes are, in effect, connected in series with the particulate material forming the connection between the electrodes in each of the compartments. Although a continuous compartment extending entirely about the circumference of the inner lining with but two spaced electrodes therein has been found to be operative, the particulate material has a tendency to separate into sections when the cuff is inflated. Therefore, the use of several separate compartments presents a transducer which is free from the possibility of an open circuit between the leads 41 and 47.

Additionally, the effect of the back pressure of the cuff caused by inflation would tend to press the carbon granules so tightly that the resistance change due to the arterial pulse might not be indicated. Accordingly, some means should be provided to insure that the pressure within the transducer compartments is equal to the pressure within the cuff. This equalization of pressure can be satisfactorily attained by providing vent holes in the inner face of each compartment and covering these holes with a porous material such as gauze as indicated at 21', 25' and 27'. The gauze allows air to pass outwardly of the compartments during inflation and at the same time, retains the granules within the compartment.

The resulting structure in cross section is shown in FIG. 3 wherein it can be seen that the various compartments 21, 25 and 27 are created by sealing an outer flexible member 22 to an inner sheet 16 at a plurality of points about the circumference of member 22 by any means such as heat sealing. The compartments so formed with electrodes are then secured to the lining 15 as illustrated in FIG. 3.

Since the material within the compartments is in a particulate or granulated form, the resistance of this material between the electrodes will decrease as the material itself is compressed. This provides the basic theory of the operation of the device which is illustrated schematically in FIG. 4. The system illustrated in FIG. 4 may be a circuit such as is used in the above stated copending application. For specific details of such circuitry, reference is hereby made to that application. Leads 41 and 47, which extend upwardly through conduit 17 in order to avoid any possibility of breaking the seal between the inner lining 15 and outer shell 13, are connected to an amplifier circuit 48 so as to place the various compartments, electrodes and associated granulated material in series with the circuit providing a signal to be amplified. The amplifier output actuates the solenoid valve 53 which opens the conduit 55 from the compressed air tank 57, allowing air to pass through conduit 59, through a relief pressure valve 61 and into line 63 which is connected to the conduit 18, thus supplying air pressure for inflating the cuff 11. A pressure gauge 65 and a recorder 67 may be connected in the conduit 63 for indicating the pressure within the cuff. Additionally, a manual switch 69 may be connected between a power source and the solenoid actuated valve in order to manually inflate the cuff when first placing the apparatus in use.

In operation, after the cuff is inflated to a point below the normal blood pressure, each arterial pulsation will compress the granulated material within the compartments, thus reducing the resistance of the circuit and providing a signal to the amplifier which is of sufficient amplitude to temporarily open the solenoid valve allowing more air to pass into the cuff. This intermittent opening and closing of the valve 53 gradually increases the pressure within the cuff until a point is reached wherein the digit is constricted by a pressure sufficient to stop the arterial pulsations. At this time the signals to the amplifier 48 cease and the valve 53 remains closed. The pressure relief valve 61 allows the pressure within the cuff to gradually decrease until arterial pulsations again appear within the digit and create a signal sufficient to open the valve 53 causing the cycle to repeat itself. Therefore, the pressure within the conduit 63 will vary slightly above and below the pressure required to stop the arterial pulsations within the digit and a reading of the pressure within conduit 63 by means such as gauge 65 or recorder 67 will provide a continuous indication of the digital blood pressure.

The above description and drawings are to be considered illustrative of the invention and not limiting in any manner. Various modifications and changes could be made by one skilled in the art without departing from the spirit and scope of this invention.

I claim:

1. A transducer comprising a flexible cuff having an inner lining and outer shell forming a sealed chamber therebetween, at least one flexible compartment attached to said inner lining, particulate electrically conductive material within said compartment, spaced electrodes within said compartment in contact with said material, electrical leads extending from said spaced electrodes outwardly of said cuff, and a conduit extending outwardly of said cuff from said sealed chamber.

2. The apparatus of claim 1 further comprising means for venting said flexible compartment.

3. A transducer comprising an outer cylindrical shell, an inner flexible cylindrical lining sealed at either end to said shell, so as to form a cuff, at least one substantially flat flexible compartment secured to said lining, granular electrically conductive material within said compartment, two spaced electrodes within said compartment contacting said conductive material, an electrical lead coupled to each of said electrodes and extending outwardly of said compartment and said cuff so as form a completed circuit through said compartment, and a conduit extending outwardly from the inner wall of said shell.

4. The apparatus of claim 3 further comprising means for venting said compartment.

5. A transducer comprising an outer cylindrical shell, an inner flexible lining sealed to said shell at the ends thereof, a plurality of sealed compartments secured to said lining about the inner circumference thereof, particulate electrically conductive material within each of said compartments, a plurality of spaced electrodes within each of said compartments and in contact with said conductive material, electrical leads interconnecting said compartments and extending outwardly from said shell so as to form a completed circuit through said compartments, and conduit means extending through said cylindrical shell.

6. The apparatus of claim 5 further comprising means for venting each of said compartments.

7. A transducer comprising an inflatable substantially cylindrical cuff, a plurality of flexible compartments spaced about the inner circumference of said cylindrical cuff, particulate electrically conductive material within each of said compartments, spaced electrodes within each of said compartments and contacting said conductive material, electrical circuit means interconnecting said electrodes and means coupled to said electrical circuit means for inflating said cuff.

8. A transducer comprising an inflatable cuff, a flexible compartment secured to the inner circumference of said cuff, particulate electrically conductive material within said compartment, spaced electrodes within said compartment, said electrodes being in contact with said conductive material, and electrical circuitry means interconnecting said electrodes and extending outwardly from said cuff, and circuit means coupled to said electrodes for inflating said cuff.

9. A transducer comprising an inflatable cuff, at least one substantially flat flexible compartment secured to the inner circumference of said cuff, particulate electrical conductive material within the compartment, spaced electrodes within the compartment and contacting said conductive material and electrical circuit means interconnecting said electrodes.

10. A transducer comprising an inflatable cuff, a compartment circumferentially secured to the inner wall of said cuff, particulate electrically conductive material within said compartment, a plurality of spaced electrodes within said compartment and contacting said conductive material, and electrical circuit means coupled between said electrodes.

References Cited by the Examiner

UNITED STATES PATENTS

| | | |
|---|---|---|
| 598,343 | 2/98 | Hill. |
| 749,854 | 1/04 | Fahrney. |
| 2,875,750 | 3/59 | Boucke. |

RICHARD A. GAUDET, *Primary Examiner.*

JORDAN FRANKLIN, LOUIS R. PRINCE,
*Examiners.*